(12) United States Patent
Jonytis et al.

(10) Patent No.: US 11,503,003 B1
(45) Date of Patent: Nov. 15, 2022

(54) ENABLING A HYBRID MESH NETWORK

(71) Applicant: UAB 360 IT, Vilnius (LT)

(72) Inventors: Mantas Jonytis, Grigiskes (LT); Rytis Karpuška, Vilniaus r. (LT)

(73) Assignee: UAB 360 IT, Vilnius (LT)

( * ) Notice: Subject to any disclaimer, the term of this patent is extended or adjusted under 35 U.S.C. 154(b) by 0 days.

(21) Appl. No.: 17/558,484

(22) Filed: Dec. 21, 2021

(51) Int. Cl.
*H04L 9/40* (2022.01)
*H04L 9/30* (2006.01)

(52) U.S. Cl.
CPC .......... *H04L 63/0428* (2013.01); *H04L 9/30* (2013.01)

(58) Field of Classification Search
CPC .............................. H04L 63/0428; H04L 9/30
See application file for complete search history.

(56) References Cited

U.S. PATENT DOCUMENTS

| | | | | |
|---|---|---|---|---|
| 10,898,653 | B2 * | 1/2021 | Saint | G08B 21/182 |
| 11,003,434 | B2 * | 5/2021 | Duvur | G06F 9/455 |
| 11,108,556 | B2 * | 8/2021 | Liderman | H04L 9/3268 |
| 11,135,363 | B2 * | 10/2021 | Rosinko | G16H 10/60 |
| 11,135,364 | B2 * | 10/2021 | Rosinko | A61M 5/14248 |
| 11,135,366 | B2 * | 10/2021 | Rosinko | A61M 5/172 |
| 11,243,688 | B1 * | 2/2022 | Remy | G06F 3/04886 |
| 11,244,057 | B2 * | 2/2022 | Pistoia | G06F 9/54 |
| 11,260,174 | B2 * | 3/2022 | Patel | G08B 21/0453 |
| 11,369,743 | B2 * | 6/2022 | Saint | A61M 5/20 |
| 2011/0210816 | A1 * | 9/2011 | Wang | H04L 63/0428 340/3.71 |
| 2017/0286614 | A1 * | 10/2017 | Morris | G06F 16/955 |
| 2021/0306308 | A1 * | 9/2021 | Wu | H04L 63/0435 |

* cited by examiner

*Primary Examiner* — Yonas A Bayou
(74) *Attorney, Agent, or Firm* — The Pattani Law Group

(57) ABSTRACT

A method including receiving, at a processor, a first assigned public key from a first device included in a mesh network and an external assigned public key from an external device not included in the mesh network; determining, by the processor, that the external device is to be included in the mesh network based at least in part on determining an association between the first device and the external device; and transmitting, by the processor based at least in part on determining that the external device is to be included in the mesh network, the first assigned public key to the external device and the external assigned public key to the first device to enable the first device and the external device to set up a meshnet connection. Various other aspects are contemplated.

20 Claims, 8 Drawing Sheets

ENABLING A HYBRID MESH NETWORK

FIELD OF DISCLOSURE

Aspects of the present disclosure generally relate to providing secure private networks, and more particularly to enabling a hybrid mesh network.

BACKGROUND

Users may rely on mesh networks (also referred to as "meshnets") to communicate (e.g., transmit and/or receive) data among a plurality of endpoints (e.g., user devices) via one or more Internet nodes (e.g., bridges, switches, infrastructure devices, etc.). In an example, a mesh network may include a plurality of endpoints communicatively coupled to each other directly or via the one or more Internet nodes. A mesh network in which all endpoints are communicatively coupled to each other may be referred to as a fully connected network. Data transmitted by a first endpoint, from among the plurality of endpoints, may be routed over the Internet via the one or more Internet nodes to a second endpoint from among the plurality of endpoints. Also, data transmitted by the first endpoint may be routed to two or more endpoints from among the plurality of endpoints.

In a mesh network, the plurality of endpoints may cooperate with each other to enable communication of the data among the plurality of endpoints. In an example, one or more of the endpoints may participate in communication of the data. In this way, the mesh network may avoid relying on a given endpoint for communication of the data. Some mesh networks may have the ability to dynamically self-organize and self-configure the plurality of endpoints. This ability may allow such mesh networks to enable dynamic distribution of workloads, particularly in the event that one or more endpoints should fail. Further, installation overhead may be reduced.

SUMMARY

In one aspect, the present disclosure contemplates a method including receiving, at a processor, a first assigned public key from a first device included in a mesh network and an external assigned public key from an external device not included in the mesh network; determining, by the processor, that the external device is to be included in the mesh network based at least in part on determining an association between the first device and the external device; and transmitting, by the processor based at least in part on determining that the external device is to be included in the mesh network, the first assigned public key to the external device and the external assigned public key to the first device to enable the first device and the external device to set up a meshnet connection.

In another aspect, the present disclosure contemplates an infrastructure device including a memory and a processor configured to: receive a first assigned public key from a first device included in a mesh network and an external assigned public key from an external device not included in the mesh network; determine that the external device is to be included in the mesh network based at least in part on determining an association between the first device and the external device; and transmit, based at least in part on determining that the external device is to be included in the mesh network, the first assigned public key to the external device and the external assigned public key to the first device to enable the first device and the external device to set up a meshnet connection.

In another aspect, the present disclosure contemplates a non-transitory computer readable medium storing instructions, which when executed by a processor associated with an infrastructure device, cause the processor to: receive a first assigned public key from a first device included in a mesh network and an external assigned public key from an external device not included in the mesh network; determine that the external device is to be included in the mesh network based at least in part on determining an association between the first device and the external device; and transmit, based at least in part on determining that the external device is to be included in the mesh network, the first assigned public key to the external device and the external assigned public key to the first device to enable the first device and the external device to set up a meshnet connection.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
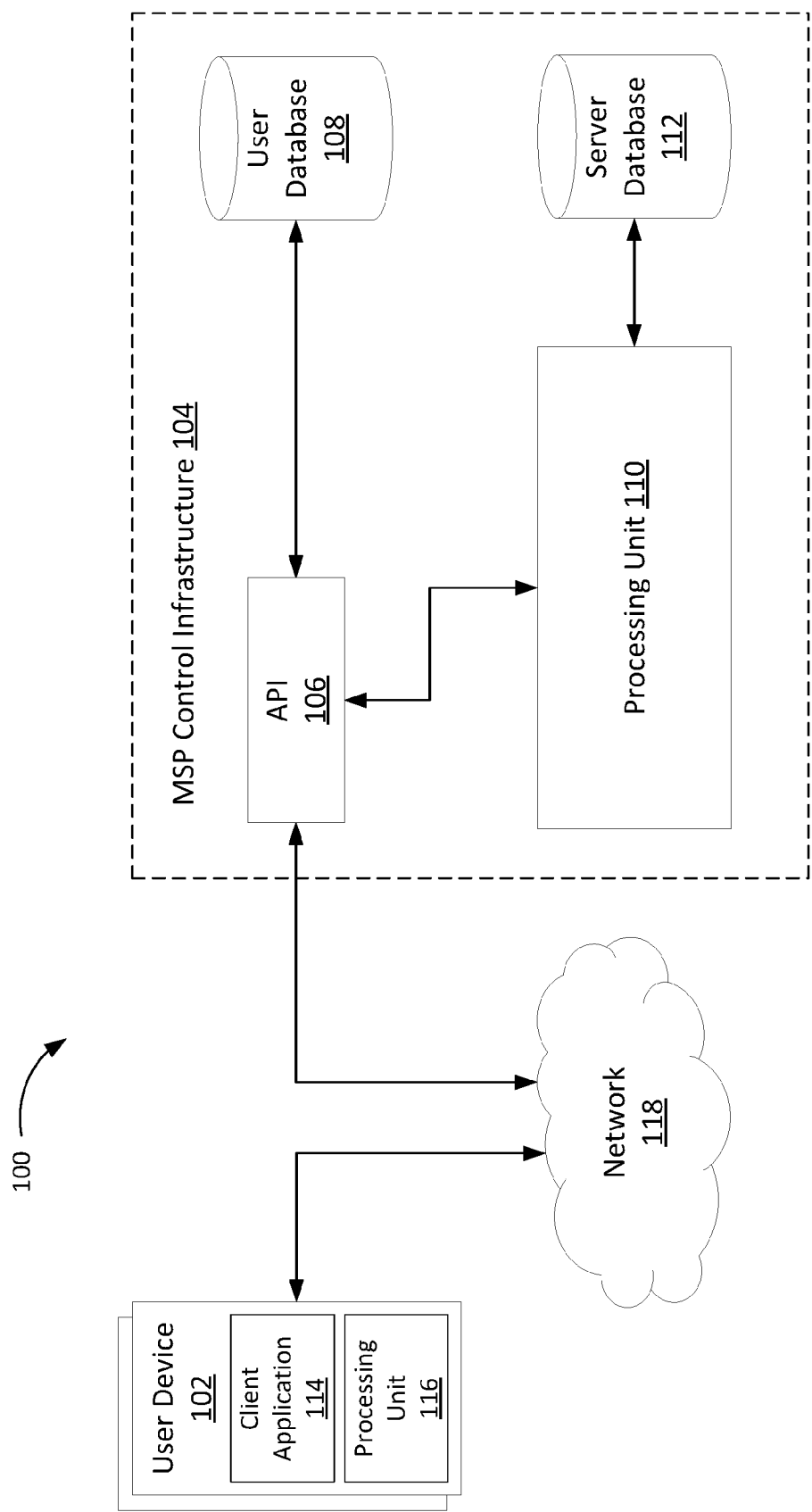

FIG. 1 is an illustration of an example system associated with enabling a hybrid mesh network, according to various aspects of the present disclosure.

Figure 2:
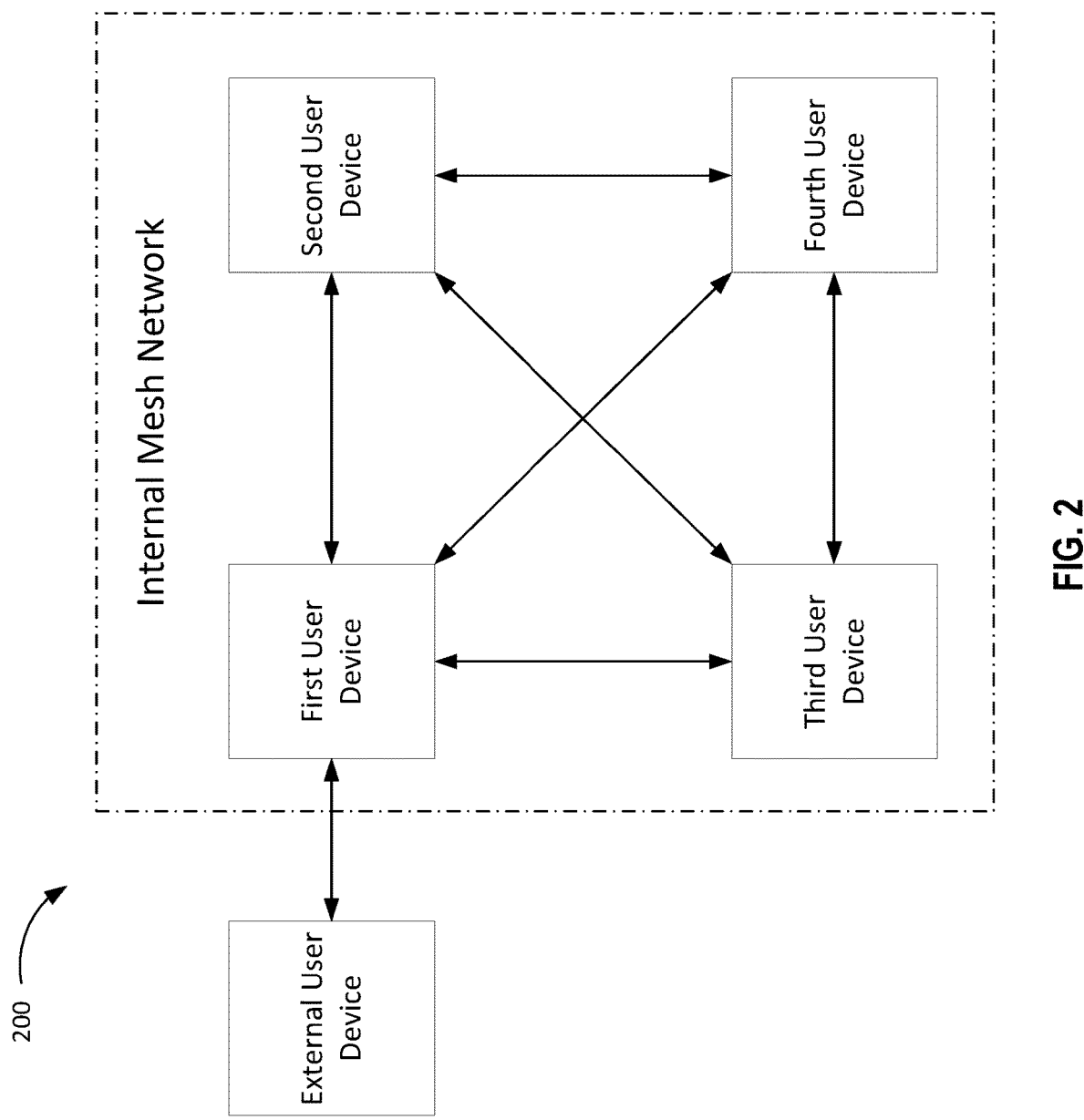

FIG. 2 is an illustration of an example associated with enabling a hybrid mesh network, according to various aspects of the present disclosure.

Figure 3:
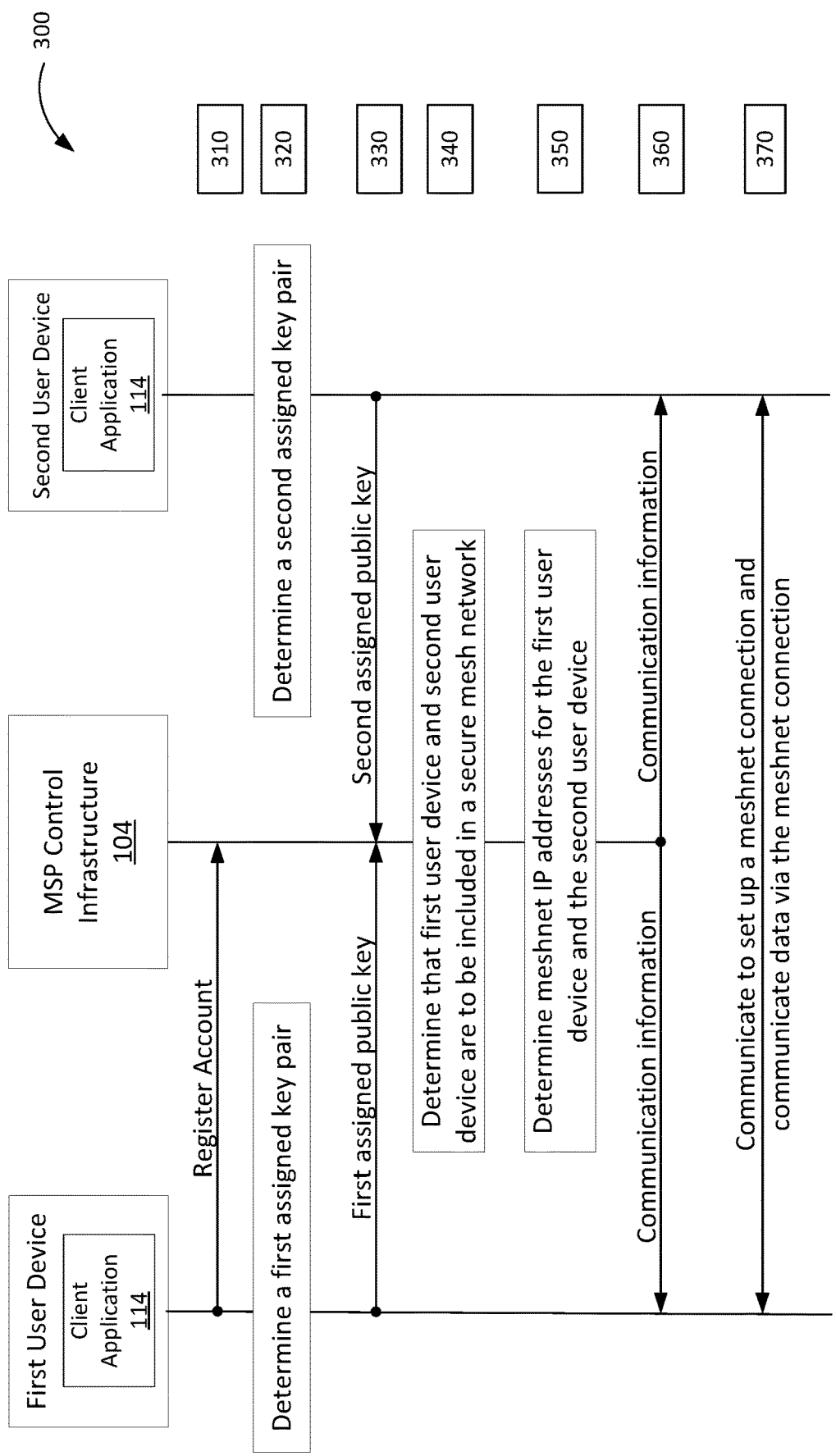

FIG. 3 is an illustration of an example flow associated with enabling a hybrid mesh network, according to various aspects of the present disclosure.

Figure 4:
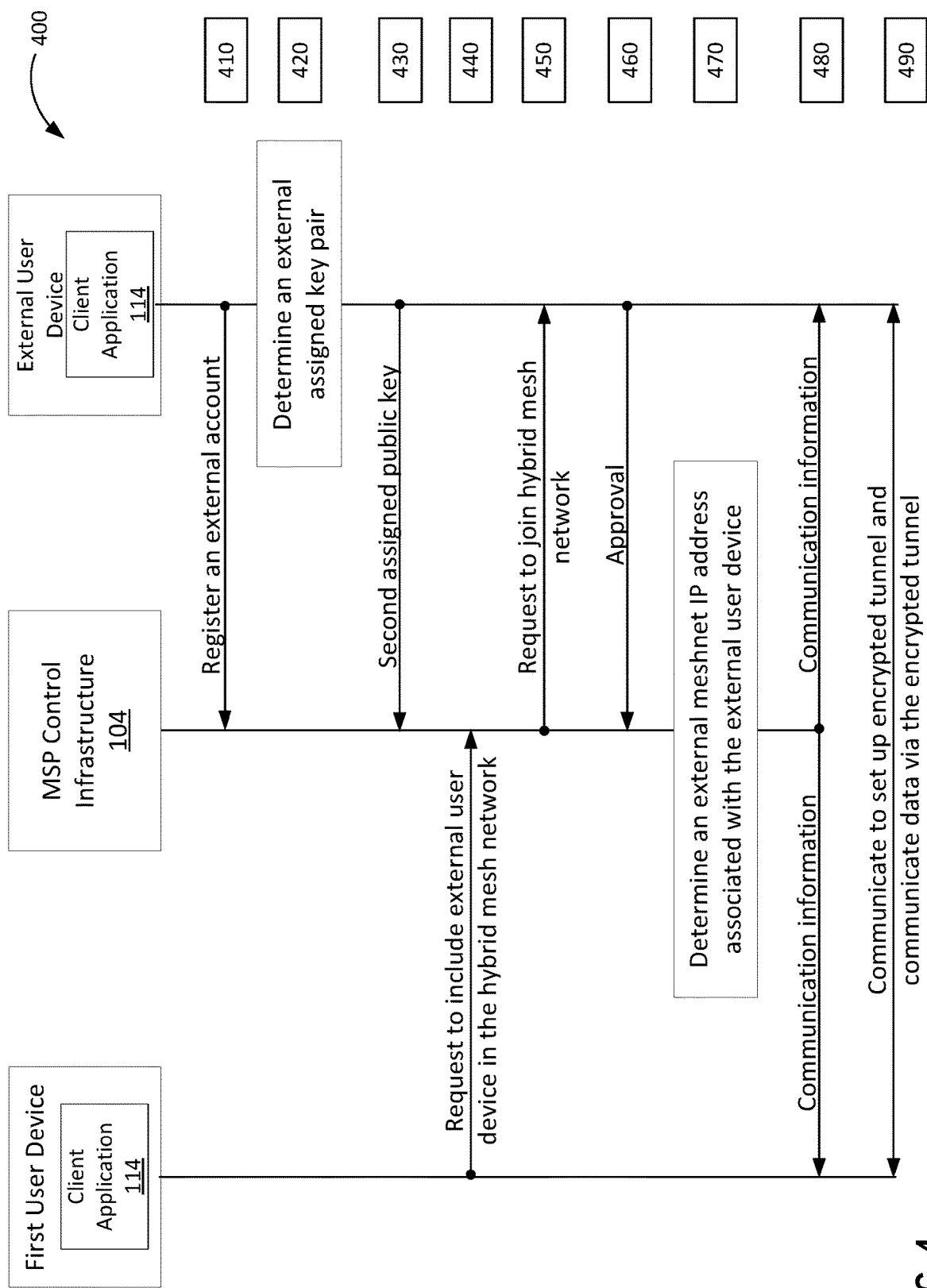

FIG. 4 is an illustration of an example flow associated with enabling a hybrid mesh network, according to various aspects of the present disclosure.

Figure 5:
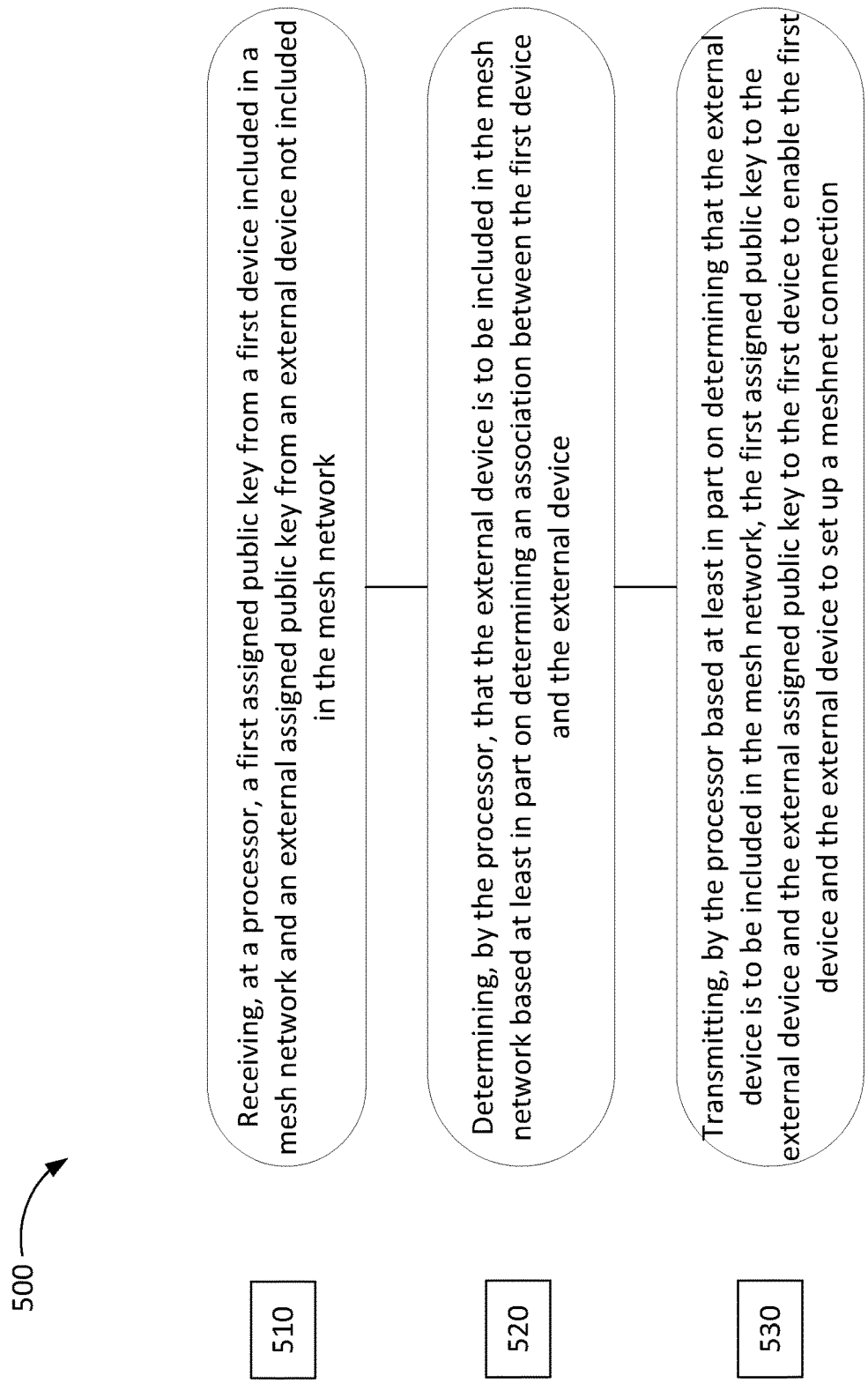

FIG. 5 is an illustration of an example process associated with enabling a hybrid mesh network, according to various aspects of the present disclosure.

Figure 6:
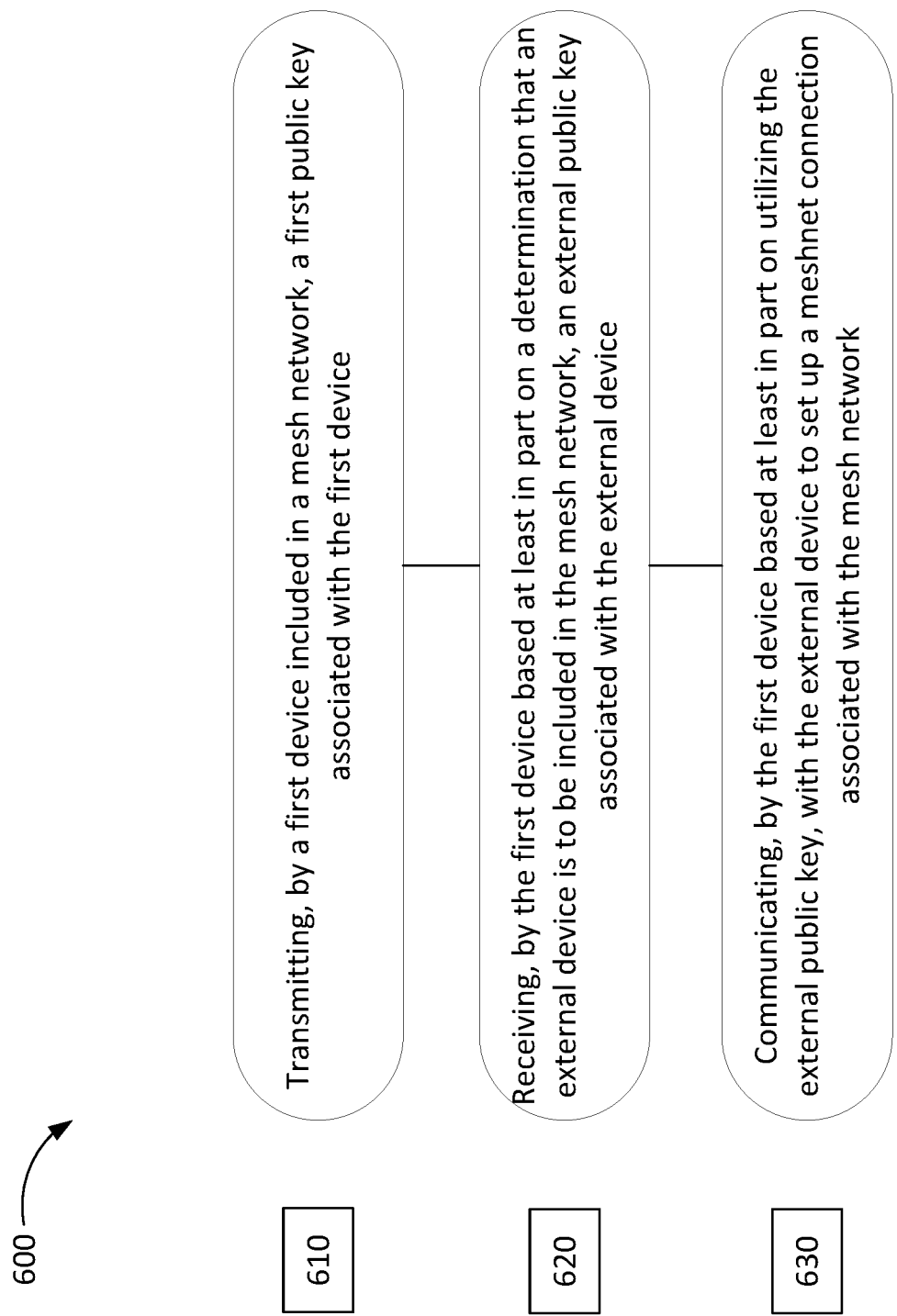

FIG. 6 is an illustration of an example process associated with enabling a hybrid mesh network, according to various aspects of the present disclosure.

Figure 7:
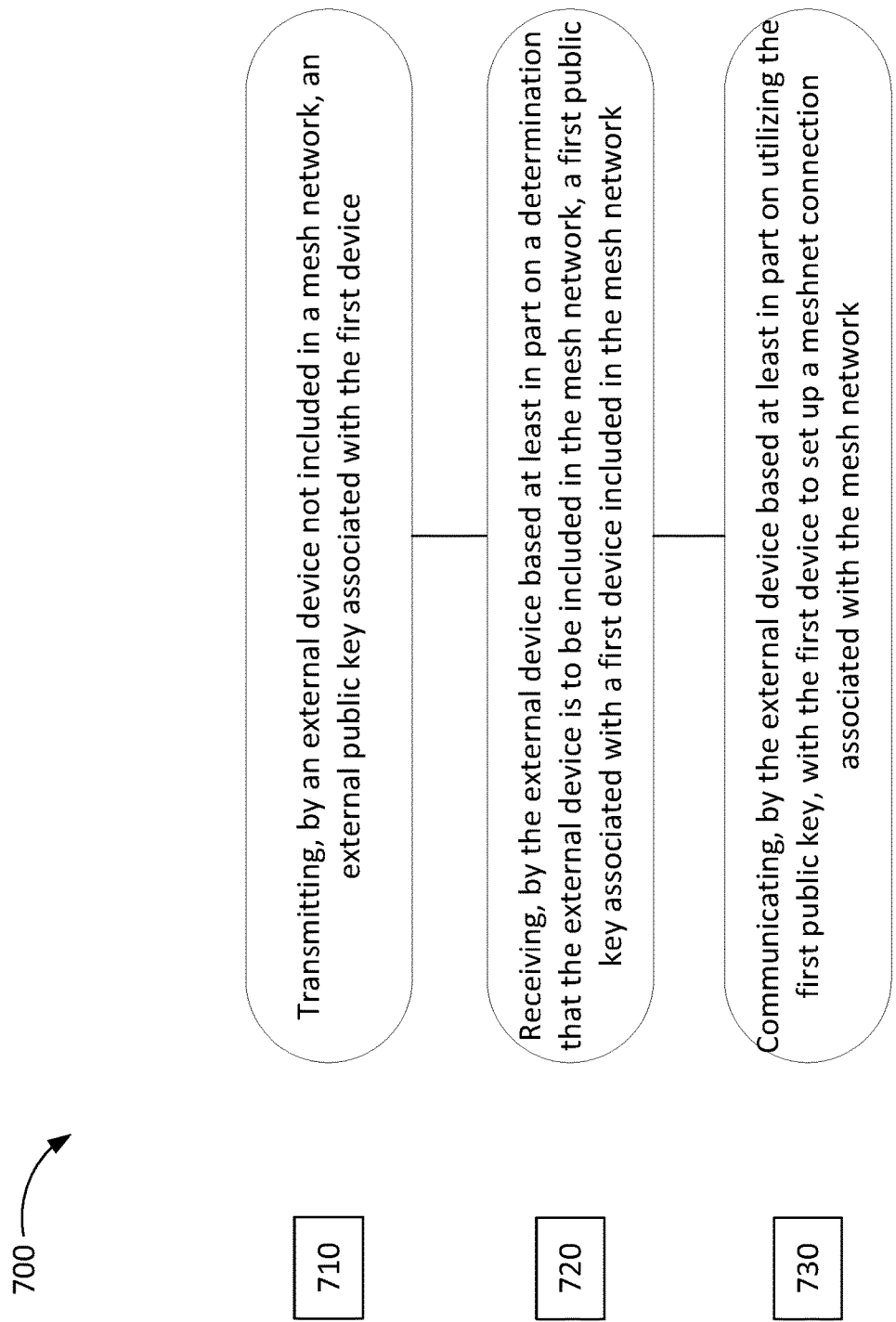

FIG. 7 is an illustration of an example process associated with enabling a hybrid mesh network, according to various aspects of the present disclosure.

Figure 8:
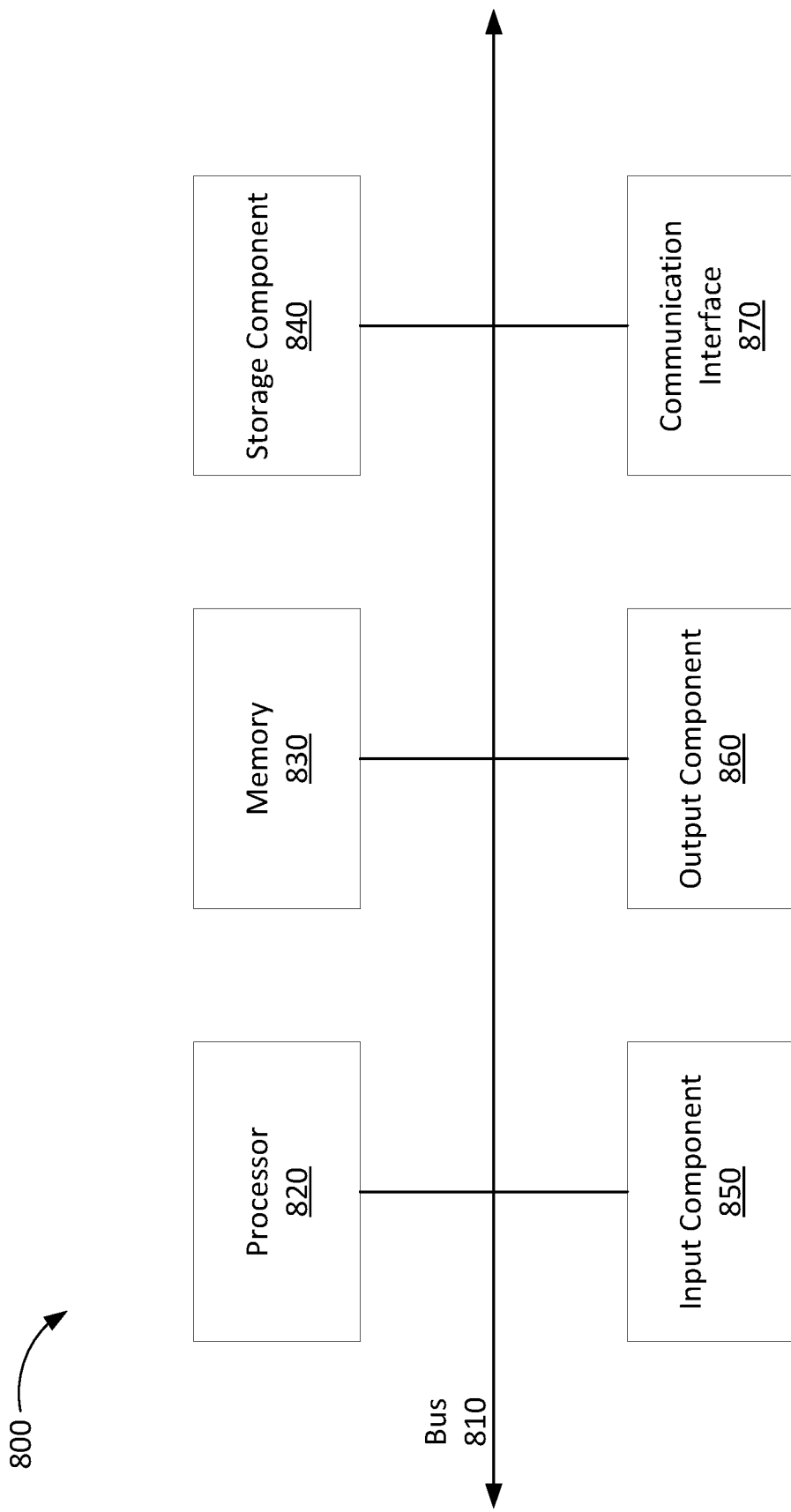

FIG. 8 is an illustration of example devices associated with enabling a hybrid mesh network, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example 100 associated with enabling a hybrid mesh network, according to various aspects of the present disclosure. Example 100 shows an architectural depiction of included components. In some aspects, the components may include one or more user devices 102 capable of communicating with a mesh network service provider (MSP) control infrastructure 104 for purposes of obtaining mesh network services. In some aspects, the one or more user devices 102 may communicate with the MSP control infrastructure 104 over a network 118. The MSP control infrastructure 104 may be controlled by a mesh network service provider and may include an application programming interface (API) 106, a user database 108, processing unit 110, and a server database 112. In some aspects, a user device 102 may utilize a processing unit 116 and/or a client application 114, which is provided by the MSP control infrastructure 104, to communicate with the API 106. The API 106 may be capable of communicating with the user database 108 and with the processing unit 110. Additionally, the processing unit 110 may be capable of communicating with the server database 112, which may be capable of storing data associated with providing mesh network services.

The user device 102 may be a physical computing device capable of hosting the client application 114 and of connecting to the network 118. The user device 102 may be, for example, a laptop, a mobile phone, a tablet computer, a desktop computer, a smart device, a router, or the like. In some aspects, the user device 102 may include, for example, mesh network enabled Internet-of-Things (IoT) devices such as smart home appliances, smart home security systems, autonomous vehicles, smart health monitors, smart factory equipment, wireless inventory trackers, biometric cyber security scanners, or the like. The network 118 may be any digital telecommunication network that permits several nodes to share and access resources. In some aspects, the network 118 may include one or more of, for example, a local-area network (LAN), a wide-area network (WAN), a campus-area network (CAN), a metropolitan-area network (MAN), a home-area network (HAN), Internet, Intranet, Extranet, and Internetwork.

The MSP control infrastructure 104 may include a combination of hardware and software components that enable provision of mesh network services to the user device 102. The MSP control infrastructure 104 may interface with (the client application on) the user device 102 via the API 106, which may include one or more endpoints to a defined message system. In some aspects, the API 106 may be configured to receive, via the network 118, a connection request from the user device 102 to establish a connection with the MSP control infrastructure 104 for purposes of obtaining the mesh network services. The connection request may include an authentication request to authenticate the user device 102. The API 106 may receive the authentication request and a request for the mesh network services in a single connection request. In some aspects, the API 106 may receive the authentication request and the request for the mesh network services in separate connection requests.

The API 106 may further be configured to handle the connection request by mediating the authentication request. For instance, the API 106 may receive from the user device 102 credentials including, for example, a unique combination of a user ID and password for purposes of authenticating the user device 102. In another example, the credentials may include a unique validation code known to an authentic user. The API 106 may provide the received credentials to the user database 108 for verification.

The user database 108 may include a structured repository of valid credentials belonging to authentic users. In one example, the structured repository may include one or more tables containing valid unique combinations of user IDs and passwords belonging to authentic users. In another example, the structured repository may include one or more tables containing valid unique validation codes associated with authentic users. The mesh network service provider may add or delete such valid unique combinations of user IDs and passwords from the structured repository at any time. Based at least in part on receiving the credentials from the API 106, the user database 108 and a processor (e.g., the processing unit 110 or another local or remote processor) may verify the received credentials by matching the received credentials with the valid credentials stored in the structured repository. In some aspects, the user database 108 and the processor may authenticate the user device 102 when the received credentials match at least one of the valid credentials. In this case, the mesh network service provider may provide mesh network services to the user device 102. When the received credentials fail to match at least one of the valid credentials, the user database 108 and the processor may fail to authenticate the user device 102. In this case, the mesh network service provider may decline to provide mesh network services to the user device 102.

When the user device 102 is authenticated, the user device 102 may initiate a connection and may transmit to the API 106 a request for the mesh network services. The processing unit 110 included in the MSP control infrastructure 104 may be configured to determine a mesh network associated with the user device 102 and/or to identify one or more user devices to be included within the determined mesh network.

The processing unit 110 may utilize the API 106 to transmit information associated with the mesh network and/or the identified one or more user devices to the user device 102. The user device 102 may transmit an initiation request to establish secure connections (e.g., encrypted tunnels) with the one or more user devices. In some aspects, the one or more user devices with which the user device 102 establishes the secure connections may also host respective client applications for communicating with the MSP control infrastructure 104 and/or with the user device 102. In some aspects, the processing unit 110 may be a logical unit including a logical component configured to perform complex operations associated with computing, for example, numerical weights related to various factors associated with providing the meshnet services.

One or more components (e.g., API 106, user database 108, processing unit 110, and/or server database 112, processing unit 116) included in the MSP control infrastructure 104 and/or included in the user device 102 may further be associated with a controller/processor, a memory, a communication interface, or a combination thereof (e.g., FIG. 8). For instance, the one or more components of the set of components may include or may be included in a controller/processor, a memory, or a combination thereof. In some aspects, the one or more of the components included in the MSP control infrastructure 104 and/or the user device 102 may be separate and distinct from each other. Alternatively, in some aspects, one or more of the components included in the MSP control infrastructure 104 and/or the user device 102 may be combined with one or more of other components included in the MSP control infrastructure 104. In some aspects, the one or more of the components included in the MSP control infrastructure 104 and/or the user device 102 may be local with respect to each other. Alternatively, in some aspects, one or more of the components included in the MSP control infrastructure 104 and/or the user device 102 may be located remotely with respect to one or more of other components included in the MSP control infrastructure 104 and/or the user device 102. Additionally, or alternatively, one or more components of the components included in the MSP control infrastructure 104 and/or the user device 102 may be implemented at least in part as software stored in a memory. For example, a component (or a portion of a component) may be implemented as instructions or code stored in a non-transitory computer-readable medium and executable by a controller or a processor to perform the functions or operations of the component. Additionally, or alternatively, a set of (one or more) components shown in FIG. 1 may be configured to perform one or more functions described as being performed by another set of components shown in FIG. 1.

As indicated above, FIG. 1 is provided as an example. Other examples may differ from what is described with regard to FIG. 1.

As discussed in further detail with respect to FIG. 3, a user may establish an internal mesh network to communicate (e.g., transmit and/or receive) data among internal endpoints (e.g., user devices). The internal endpoints may include user devices associated with a registered user account with a mesh network service provider (e.g., MSP control infrastructure) and may be available to the user for use and/or owned by the user. In example 200 shown in FIG. 2, the internal endpoints may include a first user device, a second user device, a third user device, and a fourth user device. The data may be communicated using wired communications and/or wireless communications over a network such as, for example, the Internet. The communicated data may include any information including digital information such as, for example, documents including data, voice data, image data, signal data, and/or video data. Further, the internal mesh network may be a secure mesh network that may enable the internal endpoints to communicate the data in encrypted form via meshnet connections (shown as double-ended arrows in FIG. 2).

In some cases, the user may wish to include an external device in the internal mesh network such that the external device may be able to communicate the data with one or more internal endpoints in encrypted form. The external device may include a device that is not associated with the registered user account and may be available to another entity for use and/or owned by the other entity.

To include the external device in the internal mesh network, the user may share account information (e.g., account number, username/password, etc.) associated with the registered account with the external user device. Access to the account information may enable the external user device to log into the registered account and communicate with the mesh network service provider. Based at least in part on determining that the external user device has access to the registered account, the mesh network service provider may enable the external device to join the internal mesh network. Sharing account information by the user with the external user device may be infeasible because the account information may include private information (e.g., account number, username/password, financial information, etc.), which may be compromised and used by the external device and/or by a malicious third party for unauthorized purposes.

Alternatively, the user and the other entity may register a common account with the mesh network service provider, with the internal devices and the external device having access to the common account. In other words, the internal devices and the external device may communicate with the mesh network service provider via the common account. Based at least in part on determining that the internal devices and the external user device have access to the common account, the mesh network service provider may enable the internal devices and the external device to establish a common mesh network and communicate data with each other in encrypted form.

Registering an additional account (e.g., the common account), in addition to the user's registered account (and the other entity's registered account), may be redundant. Also, registering the additional account may inefficiently consume user device resources (e.g., processing resources, memory resources, power consumption resources, battery life, or the like) and mesh network service provider resources (e.g., computational resources, network bandwidth, management resources, processing resources, memory resources, power consumption, or the like) for maintaining and servicing the additional account, which user device resources and mesh network service provider resources may otherwise be utilized to perform suitable tasks associated with mesh networks.

Various aspects of systems and techniques discussed in the present disclosure enable a hybrid mesh network. In some aspects, the hybrid mesh network may include (one or more) external devices communicating data with (one or more) internal devices in encrypted form. The internal devices may be associated with a first account registered with an MSP control infrastructure and the external devices may be associated with a second account registered with the MSP control infrastructure. The MSP control infrastructure may provide the internal devices and external devices with respective client applications that are configured to determine respective information. Further, the MSP control infrastructure may determine information including respective meshnet IP addresses for the internal devices and external devices. The MSP control infrastructure and the respective client applications may enable the internal devices and external devices to exchange such information to enable setup and utilization of encrypted tunnels (e.g., meshnet connections) to communicate data in encrypted form. In this way, the MSP control infrastructure and the respective client applications may enable the hybrid mesh network while mitigating instances of private information associated with the internal devices and external devices becoming compromised and by avoiding registration of additional, redundant accounts. As a result, the MSP control infrastructure and the respective client applications may enable efficient utilization of user device resources (e.g., processing resources, memory resources, power consumption resources, battery life, or the like) and MSP control infrastructure resources (e.g., computational resources, network bandwidth, management resources, processing resources, memory resources, or the like) for performing suitable tasks associated with the hybrid mesh network.

In some aspects, a processor (e.g., processing unit 110) associated with the MSP control infrastructure may receive a first assigned public key from a first device included in a mesh network and an external assigned public key from an external device not included in the mesh network; determine that the external device is to be included in the mesh network based at least in part on determining an association between the first device and the external device; and transmit, based at least in part on determining that the external device is to be included in the mesh network, the first assigned public key to the external device and the external assigned public key to the first device to enable the first device and the external device to set up a meshnet connection.

FIG. 3 is an illustration of an example flow 300 associated with enabling a hybrid mesh network, according to various aspects of the present disclosure. The example flow 300 may include a first user device (e.g., first endpoint), MSP control infrastructure 104, and a second user device (e.g., second endpoint) in communication with each other. In some aspects, the first user device and the second user device may be internal devices associated with a single registered account, and may be available for use to and/or owned by a user. In some aspects, the first user device and the second user device may be similar to a user device 102 discussed above with respect to FIG. 1. In some aspects, the first user device and the second user device may be located locally (e.g., in the same room, in the same building, etc.). In some aspects, the first user device and the second user device may be located remotely (e.g., in different buildings, in different cities, in different states, in different countries, etc.) with respect to each other. The first user device may install a first client application (e.g., client application 114) and the second user device may install a second client application (e.g., client application 114), the first client application and the second client application being associated with (e.g., provided by) the MSP control infrastructure 104. The first user device and the second user device may use the respective client applications to communicate with an application programming interface (API) and a processor (e.g., processing unit 110, processor 820) associated with the MSP control infrastructure 104. In some aspects, the first user device, the MSP control infrastructure 104, and the second user device may communicate with each other over a network (e.g., network 118). As discussed elsewhere herein, the MSP control infrastructure 104 may enable the first user device and/or the second user device to communicate data in encrypted form in the hybrid mesh network. Although only two user devices (e.g., endpoints) are discussed with respect to FIG. 3, the present disclosure contemplates the hybrid mesh network to include any number of user devices.

In some aspects, the client applications may enable the user devices to receive information to be processed by the client applications and/or by the MSP control infrastructure 104. Each of the client applications may include respective graphical user interfaces to receive the information via local input interfaces (e.g., touch screen, keyboard, mouse, pointer, etc.) associated with the user devices. The information may be received via text input or via a selection from among a plurality of options (e.g., pull down menu, etc.). In some aspects, the first client application and/or the second client application may activate and/or enable, at a time associated with the registration (e.g., after the registration), the graphical interface for receiving the information. For instance, the first client application (or the second client application) may cause a screen (e.g., local screen) associated with the first user device (or the second user device) to display, for example, a pop-up message to request entry of the information. Further, the client applications may enable transmission of at least a portion of the information to the MSP control infrastructure 104. In some aspects, the first client application may utilize a first processing unit (e.g., processing unit 116) included in the first user device to perform processes/operations associated with the hybrid mesh network, and the second application may utilize a second processing unit (e.g., processing unit 116) included in the second user device to perform processes/operations associated with the hybrid mesh network.

As shown by reference numeral 310, the first user device may register an account with the MSP control infrastructure 104. In some aspects, during the registration, the first user device may provide registration information such as, for example, identity of an owner of the first user device, a phone number associated with the first user device, an email address associated with the first user device, or the like. In some aspects, the first user device may set up an access system including login information (e.g., access information) such as, for example, username, password, or the like to subsequently gain access to the registered account. In some aspects, the first user device may share the login information with other internal devices (e.g., second user device) associated with the first user device to enable the other internal devices to utilize the login information to gain access to the MSP control infrastructure 104 via the registered account. In some aspects, a given user device may be associated with the first user device because the given user device may be available to a user/owner of the first user device.

As shown by reference numeral 320, the first client application and the second client application may determine information based at least in part on the registration of the account with the MSP control infrastructure 104. In an example, the first client application may determine a first asymmetric assigned key pair associated with the first user device. The first assigned key pair may be unique to the first user device and may include a first assigned public key and a first assigned private key. In this way, the first assigned public key and the first assigned private key may be device-specific and may be associated with the registered account. In some aspects, the first assigned public key and the first assigned private key may be associated with each other via, for example, a mathematical function. As a result, data encrypted using the first assigned public key may be decrypted by utilizing the first assigned private key.

Similarly, the second client application may determine a second asymmetric assigned key pair associated with the second user device. The second assigned key pair may be unique to the second user device and may include a second assigned public key and a second assigned private key. In this way, the second assigned public key and the second assigned private key may be device-specific and maybe associated with the registered account. In some aspects, the second assigned public key and the second assigned private key may be associated with each other via, for example, a mathematical function. As a result, data encrypted using the second assigned public key may be decrypted by utilizing the second assigned private key.

In some aspects, the first user device and the second user device may utilize the login information to be able to communicate with the MSP control infrastructure 104. Further, as shown by reference numeral 330, the respective client applications may transmit, and the MSP control infrastructure 104 may receive, at least a portion of the information determined by the respective client applications. For instance, the first client application may transmit, for example, the first assigned public key to the MSP control infrastructure 104 and the second client application may transmit, for example, the second assigned public key to the MSP control infrastructure 104. The MSP control infrastructure 104 may store and correlate the received information in association with the registered account and/or with the respective user devices. For instance, the MSP control infrastructure 104 may store and correlate the first assigned public key in association with the registered account and/or the first user device, and may store and correlate the second assigned public key in association with the registered account and/or the second user device.

In some aspects, the MSP control infrastructure 104 may determine communication parameters associated with the first user device and the second user device. In an example, the MSP control infrastructure 104 may determine a first public IP address associated with the first user device and a second public IP address associated with the second user device. In some aspects, the first user device may utilize the first public IP address to communicate over the Internet (e.g., clearnet). Similarly, the second user device may utilize the second public IP address to communicate over the Internet (e.g., clearnet). The MSP control infrastructure 104 may determine the first public IP address based at least in part on inspecting a first communication (e.g., IP packet) including the first assigned public key received from the first user device. The first communication may include, for example, a header that indicates the first public IP address as a source IP address associated with the first user device. Similarly, the MSP control infrastructure 104 may determine the second public IP address based at least in part on inspecting a second communication (e.g., IP packet) including the second assigned public key received from the second user device. The second communication may include, for example, a header that indicates the second public IP address as a source IP address associated with the second user device.

Further, as shown by reference numeral 340, the MSP control infrastructure 104 may determine that the first user device and the second user device are to be included in the same secure mesh network. In some aspects, the MSP control infrastructure 104 may make such a determination regarding the secure mesh network based at least in part on determining that the first user device and the second user device are communicating with the MSP control infrastructure 104 by utilizing the login information associated with the same registered account. In some aspects, the MSP control infrastructure 104 may make such a determination regarding the secure mesh network based at least in part on the first user device (or the second user device) providing information indicating that the first user device and the second user device are to be included in the secure mesh network. Such information may include, for example, identification information (e.g., type of device, email address, name/identification associated with device, etc.) associated with the second user device (or the first user device), the second public IP address (or the first public IP address), or the like.

Based at least in part on determining that the first user device and the second user device are to be included in the same secure mesh network, as shown by reference numeral 350, the MSP control infrastructure 104 may determine meshnet IP addresses for the first user device and for the second user device. In an example, the MSP control infrastructure 104 may determine a first meshnet IP address associated with the first user device and a second meshnet IP address associated with the second user device. In some aspects, the first client application may utilize the first meshnet IP address to communicate data (e.g., transmit and/or receive data) with one or more endpoints included in the hybrid mesh network and the second client application may utilize the second meshnet IP address to communicate with the one or more endpoints included in the hybrid mesh network. In some aspects, respective operating systems and/or other applications (e.g., web browsers) associated with the first user device and/or the second user device may utilize the respective meshnet IP addresses for respective purposes. The MSP control infrastructure 104 may determine the first meshnet IP address and the second meshnet IP address from, for example, IP addresses included in a subnet associated with an internal network of the ISP. In some aspects, the MSP control infrastructure 104 may determine the first meshnet IP address and the second meshnet IP address from a pool of available reserved IP addresses.

In some aspects, example processes associated with blocks 310 through 350 may take place asynchronously. In some aspects, example processes associated with blocks 360 and 370 may take place substantially synchronously.

Based at least in part on determining that the first user device and the second user device are to be included in the same secure mesh network and/or based at least in part on determining the meshnet IP addresses, as shown by reference numeral 360, the MSP control infrastructure 104 may transmit, and the first user device may receive, communication information including the second assigned public key associated with the second user device, the second public IP address associated with the second user device, the first meshnet IP address associated with the first user device, and the second meshnet IP address associated with the second user device. Similarly, based at least in part on determining that the first user device and the second user device are to be included in the same secure mesh network and/or based at least in part on determining the meshnet IP addresses, as shown by reference numeral 360, the MSP control infrastructure 104 may transmit, and the second user device may receive, communication information including the first assigned public key associated with the first user device, the first public IP address associated with the first user device, the first meshnet IP address associated with the first user device, and the second meshnet IP address associated with the second user device. As discussed below in further detail, the above transmission of assigned public keys and public and meshnet IP addresses may enable the first user device and the second user device to communicate securely and privately in the hybrid mesh network.

As shown by reference numeral 370, the first user device and the second user device may communicate with each other to set up a meshnet connection (e.g., an encrypted tunnel) for communicating encrypted data in the hybrid mesh network. To set up the meshnet connection, the first client application may utilize the second assigned public key and/or the second public IP address to securely (e.g., in encrypted form) communicate with the second user device, and the second client application may utilize the first assigned public key and/or the first public IP address to securely communicate with the first user device. In some aspects, the first user device and the second user device may communicate to securely/privately negotiate parameters (e.g., a symmetric encryption/decryption key) associated with the meshnet connection. In some aspects, the parameters may be randomly generated to provide optimized security to the communications. In an example, the first user device and the second user device may privately negotiate a randomly generated symmetric key that is to be utilized by the first user device and the second user device for encrypting and decrypting data communicated via the meshnet connection. The randomly generated symmetric key may be determined based at least in part on any combination of the first public key, the second public key, and/or randomly generated numbers. Additionally, the first user device and the second user device may utilize a secure protocol (e.g., Wireguard, IP sec, etc.) to communicate the data via the meshnet connection. Based at least in part on setting up the meshnet connection, the first user device and the second user device may start communicating encrypted data via the meshnet connection based at least in part on utilizing the negotiated parameters and the secure protocol.

In some aspects, the first user device and the second user device may establish meshnet connections with all other endpoints (e.g., the third user device and/or the fourth user device) included in the hybrid mesh network in a similar and/or analogous manner. Also, the other endpoints may establish meshnet connections with all other endpoints included in the hybrid mesh network in a similar and/or analogous manner.

The first user device and the second user device may push (e.g., transmit) data to each other. For instance, when the first user device has data available for transmission to the second user device, the first user device may push a notification to the second user device indicating that the first user device wishes to transmit data to the second user device. In some aspects, the push notification may identify the data to be transmitted. Further, based at least in part on transmitting the push notification, the first user device may transmit the data to the second user device via the encrypted tunnel. In some aspects, prior to transmitting the data, the first user device may wait to receive a confirmation message from the second user device indicating that the second user device is ready to receive the data. In some aspects, the first user device may transmit the data even when the second user device is not present (e.g., temporarily disconnected) from the secure mesh network. In this case, the first client application may suspend transmission of the data and may automatically resume transmission of the data based at least in part on determining that the second user device is present (e.g., reconnected) in the hybrid mesh network. The second user device may push data to the first user device in a similar and/or analogous manner.

In some aspects, the first user device and the second user device may pull (e.g., request) data from each other. For instance, when the first user device wishes to receive data from the second user device, the first user device may transmit a request to the second user device indicating that the first user device wishes to receive data from the second user device. In some aspects, the request may identify the data to be received. Further, based at least in part on receiving the request, the second user device may transmit the data to the first user device via the encrypted tunnel. In some aspects, the first user device may transmit the request even when the second user device is not present (e.g., temporarily disconnected) from the secure mesh network. In this case, the first client application may suspend transmission of the request and may automatically resume transmission of the request based at least in part on determining that the second user device is included (e.g., reconnected) in the secure mesh network. The second user device may pull data from the first user device in a similar and/or analogous manner.

As indicated above, FIGS. 2 and 3 are provided as examples. Other examples may differ from what is described with regard to FIGS. 2 and 3.

FIG. 4 is an illustration of an example flow 400 associated with enabling a hybrid mesh network, according to various aspects of the present disclosure. The example flow 400 may include a first user device (e.g., first endpoint), MSP control infrastructure 104, and an external user device in communication with each other. In some aspects, the first user device may be an internal user device included in the hybrid mesh network with, for example, a second user device, a third user device, and/or a fourth user device, as discussed above with respect to FIG. 3. In some aspects, the external user device may not be associated with the registered account associated with the first user device, and may be available to another entity for use and/or owned by the other entity. In some aspects, the first user device and the external user device may be similar to user device 102 discussed above with respect to FIG. 1. In some aspects, the first user device and the external user device may be located locally (e.g., in the same room, in the same building, etc.). In some aspects, the first user device and the external user device may be located remotely (e.g., in different buildings, in different cities, in different states, in different countries, etc.) with respect to each other. In some aspects, the first user device may install a first client application (e.g., client application 114) and the external user device may install an external client application (e.g., client application 114), the first client application and the external client application being associated with the MSP control infrastructure 104. The first user device and the external user device may use the respective client applications to communicate with an application programming interface (API) and a processor (e.g., processing unit 110, processor 820) associated with the MSP control infrastructure 104. In some aspects, the first user device, the MSP control infrastructure 104, and the external user device may communicate with each other over a network (e.g., network 118). In some aspects, as discussed elsewhere herein, the MSP control infrastructure 104 may enable the external user device to communicate data in encrypted form with the first user device (and/or other user devices) in the hybrid mesh network.

Although only one external device is discussed with respect to FIG. 4, the present disclosure contemplates the hybrid mesh network to include any number of external user devices. Further, the present disclosure contemplates any number of endpoints (e.g., first user device, second user device, third user device, fourth user device, etc.) to communicate with any number of external user devices in the hybrid mesh network in a similar and/or analogous manner as the first user device and the external user device.

As shown by reference numeral 410, the external user device may register an external user account with the MSP control infrastructure 104. In some aspects, the external user account may be different from and/or unrelated to the first user account associated with the first user device. During the registration, the external user device may provide registration information such as, for example, identity of an owner of the external user device, a phone number associated with the external user device, an email address associated with the external user device, or the like. In some aspects, the external user device may set up an access system including login information (e.g., access information) such as, for example, username, password, or the like to subsequently gain access to the external user account. The MSP control infrastructure may use such information (e.g., type of device, email address, name/identification, external public IP address) associated with the external user device to identify the external user device.

As shown by reference numeral 420, the external client application may determine information based at least in part on the registration of the external user account with the MSP control infrastructure 104. In an example, the external client application may determine an external asymmetric assigned key pair associated with the external user device. The external assigned key pair may be unique to the external user device and may include an external assigned public key and an external assigned private key. In this way, the external assigned public key and the external assigned private key may be device-specific and maybe associated with the external user account. In some aspects, the external assigned public key and the external assigned private key may be associated with each other via, for example, a mathematical function. As a result, data encrypted using the external assigned public key may be decrypted by utilizing the external assigned private key.

In some aspects, the first user device and the external user device may utilize respective login information to log into respective registered accounts and communicate with the MSP control infrastructure 104. Further, as shown by reference numeral 430, the external client application may transmit, and the MSP control infrastructure 104 may receive, at least a portion of the information determined by the external client application. The MSP control infrastructure 104 may store and correlate the received information in association with an appropriate registered account and/or with the appropriate user device. For instance, the external client application may transmit, for example, the external assigned public key to the MSP control infrastructure 104. The MSP control infrastructure 104 may store and correlate the external assigned public key in association with the external account and/or the external user device.

In some aspects, the MSP control infrastructure 104 may determine communication parameters associated with the external user device. In an example, the MSP control infrastructure 104 may determine an external public IP address associated with external user device. In some aspects, the external user device may utilize the external public IP address to communicate over the Internet (e.g., clearnet). The MSP control infrastructure 104 may determine the external public IP address based at least in part on analyzing a communication (e.g., IP packet) including the external assigned public key received from the external user device. The communication may include, for example, a header that indicates the external public IP address as a source IP address associated with the first user device.

As shown by reference numeral 440, the first user device may transmit, and the MSP control infrastructure 104 may receive, a request to include the external user device in the hybrid mesh network. In some aspects, the request may include information to identify the external device as the device to be included in the hybrid mesh network. Such information may include, for example, identification information (e.g., type of device, email address, name/identification associated with device, etc.) associated with the external user device, the external public IP address, or the like. In some aspects, the first user device may obtain the external public IP address through independent communication with the external user device or with another entity capable of sharing the external public IP address with the first user device.

In some aspects, the external user device may transmit, and the MSP control infrastructure 104 may receive, a request to include the external user device in the hybrid mesh network. In some aspects, the request may include information to identify the first user device to indicate that the external user device is to be included in the hybrid mesh network that includes the first user device. Such information may include, for example, identification information (e.g., type of device, email address, name/identification associated with device, etc.) associated with the first user device, the first public IP address, or the like. The external user device may obtain the first public IP address through independent communication with the first user device or with another entity capable of sharing the first public IP address with the external user device. In some aspects, the request may include information to identify the mesh network including the first user device to indicate the mesh network in which the external device is to be included.

Based at least in part on receiving the request from the first user device or from the external user device, as shown by reference numeral 450, the MSP control infrastructure 104 may transmit, and the external user device may receive, a request to join the hybrid mesh network that includes the first user device. In some aspects, the request transmitted by the MSP control infrastructure 104 may identify the first user device to indicate to the external user device that the request transmitted by the MSP control infrastructure 104 is transmitted based at least in part on receiving the request from the first user device. In some aspects, the request transmitted by the MSP control infrastructure 104 may identify the hybrid mesh network including the first user device to indicate that the request transmitted by the MSP control infrastructure 104 is associated with the hybrid mesh network that includes the first user device.

Based at least in part on receiving the request from the MSP control infrastructure 104, as shown by reference numeral 460, the external user device may transmit, and the MSP control infrastructure 104 may receive, an approval from the external user device to join the hybrid mesh network that includes the first user device. Based at least in part on receiving the approval from the external user device, the MSP control infrastructure 104 may determine that the external device is to be included in the hybrid mesh network that includes the first user device.

Based at least in part on receiving the approval from the external user device and/or based at least in part on determining that the external device is to be included in the hybrid mesh network that includes the first user device, as shown by reference numeral 470, the MSP control infrastructure 104 may determine an external meshnet IP address associated with the external user device. In some aspects, the external user device may utilize the external meshnet IP address to communicate with the first user device (and other user devices) included in the hybrid mesh network. In some aspects, the external user device may already be included in another mesh network (e.g., an internal mesh network including the external user device) and the MSP control infrastructure 104 may have previously determined the meshnet IP address associated with the external user device. In this case, the MSP control infrastructure 104 may determine that the external user device is to utilize the previously determined external meshnet IP address to communicate with the first user device (and other user devices) included in the hybrid mesh network. In some aspects, the first client application may utilize the first meshnet IP address to communicate data with the external user device in the hybrid mesh network and the external client application may utilize the external meshnet IP address to communicate with the first user device in the hybrid mesh network. The MSP control infrastructure 104 may determine the first meshnet IP address and the second meshnet IP address from, for example, IP addresses included in a subnet associated with an internal network of the ISP. In some aspects, the MSP control infrastructure 104 may determine the external meshnet IP address from a pool of available reserved IP addresses.

In some aspects, example processes associated with blocks 410 through 470 may take place asynchronously. In some aspects, example processes associated with blocks 480 and 490 may take place substantially synchronously.

Based at least in part on determining that the external user device is to be included in the hybrid mesh network and/or based at least in part on determining the external meshnet IP address, as shown by reference numeral 480, the MSP control infrastructure 104 may transmit, and the first user device may receive, communication information including the external assigned public key associated with the external user device, the external public IP address associated with the external user device, and the external meshnet IP address associated with the external user device. Similarly, based at least in part on determining that the external user device is to be included in the hybrid mesh network and/or based at least in part on determining the external meshnet IP address, as shown by reference numeral 480, the MSP control infrastructure 104 may transmit, and the external user device may receive, communication information including the first assigned public key associated with the first user device, the first public IP address associated with the first user device, the first meshnet IP address associated with the first user device, and the external meshnet IP address associated with the external user device. As discussed below in further detail, the above transmission of assigned public keys and public and meshnet IP addresses may enable the first user device and the external user device to communicate securely and privately in the hybrid mesh network.

As shown by reference numeral 490, the first user device and the external user device may communicate with each other to set up a meshnet connection (e.g., an encrypted tunnel) for communicating encrypted data in the hybrid mesh network. To set up the meshnet connection, the first client application may utilize the external assigned public key and/or the external public IP address to securely (e.g., in encrypted form) communicate with the external user device, and the external client application may utilize the first assigned public key and/or the first public IP address to securely communicate with the first user device. In some aspects, the first user device and the external user device may communicate to securely/privately negotiate parameters (e.g., a symmetric encryption/decryption key) associated with the meshnet connection. In some aspects, the parameters may be randomly generated to provide optimized security to the communications. In an example, the first user device and the external user device may privately negotiate a randomly generated symmetric key that is to be utilized by the first user device and the external user device for encrypting and decrypting the data communicated via the meshnet connection. In some aspects, the randomly generated symmetric key may be determined based at least in part on any combination of the first public key, the external public key, and/or a randomly generated number. Additionally, the first user device and the external user device may utilize a secure protocol (e.g., Wireguard, IP sec, etc.) to communicate the data via the meshnet connection. Based at least in part on setting up the meshnet connection, the first user device and the external user device may start communicating encrypted data via the meshnet connection based at least in part on utilizing the negotiated and exchanged parameters and the secure protocol.

In some aspects, the external user device may establish meshnet connections with all other endpoints (e.g., the second user device, and/or the third user device, and/or the fourth user device) included in the hybrid mesh network in a similar and/or analogous manner.

In some aspects, the first user device and the external user device may push (e.g., transmit) data to each other. For instance, when the first user device has data available for transmission to the external user device, the first user device may push a notification to the external user device indicating that the first user device wishes to transmit data to the external user device. In some aspects, the push notification may identify the data to be transmitted. Further, based at least in part on transmitting the push notification, the first user device may transmit the data to the external user device via the encrypted tunnel. In some aspects, prior to transmitting the data, the first user device may wait to receive a confirmation message from the external user device indicating that the external user device is ready to receive the data. In some aspects, the first user device may transmit the data even when the external user device is not present (e.g., temporarily disconnected) in the hybrid mesh network. In this case, the first client application may suspend transmission of the data and may automatically resume transmission of the data based at least in part on determining that the external user device is present (e.g., reconnected) in the hybrid mesh network. The external user device may push data to the first user device in a similar and/or analogous manner.

In some aspects, the first user device and the external user device may pull (e.g., request) data from each other. For instance, when the first user device wishes to receive data from the external user device, the first user device may transmit a request to the external user device indicating that the first user device wishes to receive data from the external user device. In some aspects, the request may identify the data to be received. Further, based at least in part on receiving the request, the external user device may transmit the data to the first user device via the encrypted tunnel. In some aspects, the first user device may transmit the request even when the external user device is not present (e.g., temporarily disconnected) in the hybrid mesh network. In this case, the first client application may suspend transmission of the request and may automatically resume transmission of the request based at least in part on determining that the external user device is present (e.g., reconnected) in the hybrid mesh network. The external user device may pull data from the first user device in a similar and/or analogous manner.

By utilizing the systems and techniques discussed herein, the MSP control infrastructure and the respective client applications may enable the hybrid mesh network while mitigating instances of private information associated with user devices (e.g., internal devices and external devices) becoming compromised and by avoiding registration of redundant accounts, thereby enabling efficient utilization of user device resources (e.g., processing resources, memory resources, power consumption resources, battery life, or the like) and MSP control infrastructure resources (e.g., computational resources, network bandwidth, management resources, processing resources, memory resources, or the like) for performing suitable tasks associated with hybrid mesh networks.

As indicated above, FIG. 4 is provided as an example. Other examples may differ from what is described with regard to FIG. 4.

FIG. 5 is an illustration of an example process 500 associated with enabling a hybrid mesh network, according to various aspects of the present disclosure. In some aspects, the process 500 may be performed by a memory and/or a processor/controller (e.g., processing unit 110, processor 820) associated with an MSP control infrastructure (e.g., MSP control infrastructure 104). As shown by reference numeral 510, process 500 may include receiving, at a processor, a first assigned public key from a first device included in a mesh network and an external assigned public key from an external device not included in the mesh network. For instance, the MSP control infrastructure may utilize a communication interface (e.g., communication interface 870) and the associated memory and/or processor to receive a first assigned public key from a first device included in a mesh network and an external assigned public key from an external device not included in the mesh network, as discussed elsewhere herein.

As shown by reference numeral 520, process 500 may include determining, by the processor, that the external device is to be included in the mesh network based at least in part on determining an association between the first device and the external device. For instance, the MSP control infrastructure may utilize the associated memory and/or processor to determine that the external device is to be included in the mesh network based at least in part on determining an association between the first device and the external device, as discussed elsewhere herein.

As shown by reference numeral 530, process 500 may include transmitting, by the processor based at least in part on determining that the external device is to be included in the mesh network, the first assigned public key to the external device and the external assigned public key to the first device to enable the first device and the external device to set up a meshnet connection. For instance, the MSP control infrastructure may utilize the associated communication interface along with the memory and/or processor to transmit, based at least in part on determining that the external device is to be included in the mesh network, the first assigned public key to the external device and the external assigned public key to the first device to enable the first device and the external device to set up a meshnet connection, as discussed elsewhere herein.

Process 500 may include additional aspects, such as any single aspect or any combination of aspects described below and/or in connection with one or more other processes described elsewhere herein.

In a first aspect, process 500 may include determining, by the processor based at least in part on receiving the first assigned public key and the external assigned public key, a first communication parameter associated with the first device and an external communication parameter associated with the external device; and transmitting, by the processor, the first communication parameter to the external device and the external communication parameter to the first device to enable the first device and the external device to set up the meshnet connection.

In a second aspect, alone or in combination with the first aspect, process 500 may include determining an external meshnet internet protocol (IP) to be utilized by the external device to communicate data over the meshnet connection.

In a third aspect, alone or in combination with the first through second aspects, in process 500, determining the association between the first device and the external device includes receiving a request from the first device or from the external device, the request indicating that the external device is to be included in the mesh network.

In a fourth aspect, alone or in combination with the first through third aspects, in process 500, determining the association between the first device and the external device includes receiving a request from the external device, the request identifying the mesh network.

In a fifth aspect, alone or in combination with the first through fourth aspects, in process 500, the mesh network includes a second device located locally with respect to the first device and the external device is located remotely with respect to the first device.

In a sixth aspect, alone or in combination with the first through fifth aspects, in process 500, the processor is associated with a first client application responsible for determining the first assigned public key and is associated with an external client application responsible for determining the external assigned public key.

In a seventh aspect, alone or in combination with the first through sixth aspects, in process 500, the first device is associated with a first account registered with the processor and the external device is associated with an external account registered with the processor, the first account being different from the external account.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of an example process 600 associated with enabling a hybrid mesh network, according to various aspects of the present disclosure. In some aspects, the process 600 may be performed by a memory and/or a processor/controller (e.g., processing unit 116, processor 820) associated with a user device (e.g., first user device) executing a client application. As shown by reference numeral 610, process 600 may include transmitting, by a first device included in a mesh network, a first public key associated with the first device. For instance, the user device may utilize an associated communication interface (e.g., communication interface 870) along with the memory and/or or processor to transmit, by a first device included in a mesh network, a first public key associated with the first device, as discussed elsewhere herein.

As shown by reference numeral 620, process 600 may include receiving, by the first device based at least in part on a determination that an external device is to be included in the mesh network, an external public key associated with the external device. For instance, the user device may utilize the associated communication interface, memory, and/or processor to receive, based at least in part on a determination that an external device is to be included in the mesh network, an external public key associated with the external device, as discussed elsewhere herein.

As shown by reference numeral 630, process 600 may include communicating, by the first device based at least in part on utilizing the external public key, with the external device to set up a meshnet connection associated with the mesh network. For instance, the user device may utilize the associated communication interface, memory, and/or processor to communicate (e.g., transmit and/or receive), by the first device based at least in part on utilizing the external public key, with the external device to set up a meshnet connection associated with the mesh network, as discussed elsewhere herein.

Process 600 may include additional aspects, such as any single aspect or any combination of aspects described below and/or in connection with one or more other processes described elsewhere herein.

In a first aspect, process 600 may include receiving, by the first device, an external communication parameter associated with the external device, the external communication parameter to be utilized by the first device to communicate with the external device to set up the meshnet connection.

In a second aspect, alone or in combination with the first aspect, process 600 may include receiving a first meshnet internet protocol (IP) address associated with the first device and an external meshnet IP address associated with the external device, the first meshnet IP address and the external meshnet IP address to be utilized by the first device and the external device to communicate over the meshnet connection.

In a third aspect, alone or in combination with the first through second aspects, process 600 may include encrypting, based at least in part on utilizing the external public key, a message associated with setting up the meshnet connection; and transmitting the encrypted message to the external device.

In a fourth aspect, alone or in combination with the first through third aspects, process 600 may include negotiating, with the external device, a symmetric key to be utilized to communicate encrypted data over the meshnet connection.

In a fifth aspect, alone or in combination with the first through fourth aspects, process 600 may include transmitting a push notification to the external device over the meshnet connection, the push notification indicating that the first device has data to transmit to the external device.

In a sixth aspect, alone or in combination with the first through fifth aspects, process 600 may include transmitting a request to the external device over the meshnet connection, the request indicating that the first device has data to receive from the external device.

Although FIG. 6 shows example blocks of the process, in some aspects, the process may include additional blocks, fewer blocks, different blocks, or differently arranged blocks than those depicted in FIG. 6. Additionally, or alternatively, two or more of the blocks of the process may be performed in parallel.

As indicated above, FIG. 6 is provided as an example. Other examples may differ from what is described with regard to FIG. 6.

FIG. 7 is an illustration of an example process 700 associated with enabling a hybrid mesh network, according to various aspects of the present disclosure. In some aspects, the process 700 may be performed by a memory and/or a processor/controller (e.g., processing unit 116, processor 820) associated with a user device (e.g., external user device) executing a client application. As shown by reference numeral 710, process 700 may include transmitting, by an external device not included in a mesh network, an external public key associated with the first device. For instance, the user device may utilize an associated communication interface (e.g., communication interface 870) with the associated memory and/or a processor to transmit an external public key associated with the first device, as discussed elsewhere herein.

As shown by reference numeral 820, process 700 may include receiving, by the external device based at least in part on a determination that the external device is to be included in the mesh network, a first public key associated with a first device included in the mesh network. For instance, the user device may utilize the associated communication interface, memory, and/or processor to receive, based at least in part on a determination that the external device is to be included in the mesh network, a first public key associated with a first device included in the mesh network, as discussed elsewhere herein.

As shown by reference numeral 730, process 700 may include communicating, by the external device based at least in part on utilizing the first public key, with the first device to set up a meshnet connection associated with the mesh network. For instance, the user device may utilize the associated communication interface, memory, and/or processor to communicate (e.g., transmit and/or receive), based at least in part on utilizing the first public key, with the first device to set up a meshnet connection associated with the mesh network, as discussed elsewhere herein.

Process 700 may include additional aspects, such as any single aspect or any combination of aspects described below and/or in connection with one or more other processes described elsewhere herein.

In a first aspect, process 700 may include receiving, by the external device, a first communication parameter associated with the first device, the first communication parameter to be utilized by the external device to communicate with the first device to set up the meshnet connection.

In a second aspect, alone or in combination with the first aspect, process 700 may include receiving a first meshnet internet protocol (IP) address associated with the first device and an external meshnet IP address associated with the external device, the first meshnet IP address and the external meshnet IP address to be utilized by the first device and the external device to communicate over the meshnet connection.

In a third aspect, alone or in combination with the first through second aspects, process 700 may include encrypting, based at least in part on utilizing the first public key, a message associated with setting up the meshnet connection; and transmitting the encrypted message to the first device.

In a fourth aspect, alone or in combination with the first through third aspects, process 700 may include negotiating, with the first device, a symmetric key to be utilized to communicate encrypted data over the meshnet connection.

In a fifth aspect, alone or in combination with the first through fourth aspects, process 700 may include transmitting a push notification to the first device over the meshnet connection, the push notification indicating that the external device has data to transmit to the first device.

In a sixth aspect, alone or in combination with the first through fifth aspects, process 700 may include transmitting a request to the first device over the meshnet connection, the request indicating that the external device has data to receive from the first device.

Although FIG. 7 shows example blocks of the process, in some aspects, the process may include additional blocks, fewer blocks, different blocks, or differently arranged blocks than those depicted in FIG. 7. Additionally, or alternatively, two or more of the blocks of the process may be performed in parallel.

As indicated above, FIG. 7 is provided as an example. Other examples may differ from what is described with regard to FIG. 7.

FIG. 8 is an illustration of example devices 800 associated with enabling a hybrid mesh network, according to various aspects of the present disclosure. In some aspects, the example devices 800 may form part of or implement the systems, servers, environments, infrastructures, components, devices, or the like described elsewhere herein (e.g., user device, MSP control infrastructure, etc.) and may be used to perform example processes described elsewhere herein. The example devices 800 may include a universal bus 810 communicatively coupling a processor 820, a memory 830, a storage component 840, an input component 850, an output component 860, and a communication interface 870.

Bus 810 may include a component that permits communication among multiple components of a device 800. Processor 820 may be implemented in hardware, firmware, and/or a combination of hardware and software. Processor 820 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 820 may include one or more processors capable of being programmed to perform a function. Memory 830 may include a random access memory (RAM), a read only memory (ROM), and/or another type of dynamic or static storage device (e.g., a flash memory, a magnetic memory, and/or an optical memory) that stores information and/or instructions for use by processor 820.

Storage component 840 may store information and/or software related to the operation and use of a device 800. For example, storage component 840 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 850 may include a component that permits a device 800 to receive information, such as via user input (e.g., a touch screen display, a keyboard, a keypad, a mouse, a button, a switch, and/or a microphone). Additionally, or alternatively, input component 850 may include a component for determining location (e.g., a global positioning system (GPS) component) and/or a sensor (e.g., an accelerometer, a gyroscope, an actuator, another type of positional or environmental sensor, and/or the like). Output component 860 may include a component that provides output information from device 800 (via, for example, a display, a speaker, a haptic feedback component, an audio or visual indicator, and/or the like).

Communication interface 870 may include a transceiver-like component (e.g., a transceiver, a separate receiver, a separate transmitter, and/or the like) that enables a device 800 to communicate with other devices, such as via a wired connection, a wireless connection, or a combination of wired and wireless connections. Communication interface 870 may permit device 800 to receive information from another device and/or provide information to another device. For example, communication interface 870 may include an Ethernet interface, an optical interface, a coaxial interface, an infrared interface, a radio frequency (RF) interface, a universal serial bus (USB) interface, a Wi-Fi interface, a cellular network interface, and/or the like.

A device 800 may perform one or more processes described elsewhere herein. A device 800 may perform these processes based on processor 820 executing software instructions stored by a non-transitory computer-readable medium, such as memory 830 and/or storage component 840. As used herein, the term "computer-readable medium" may refer to a non-transitory memory device. A memory device may include memory space within a single physical storage device or memory space spread across multiple physical storage devices.

Software instructions may be read into memory 830 and/or storage component 840 from another computer-readable medium or from another device via communication interface 870. When executed, software instructions stored in memory 830 and/or storage component 840 may cause processor 820 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 8 are provided as an example. In practice, a device 800 may include additional components, fewer components, different components, or differently arranged components than those shown in FIG. 8. Additionally, or alternatively, a set of components (e.g., one or more components) of a device 800 may perform one or more functions described as being performed by another set of components of a device 800.

As indicated above, FIG. 8 is provided as an example. Other examples may differ from what is described with regard to FIG. 8.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" or "device" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, at a processor configured to determine a mesh network, one or more assigned public keys associated with one or more devices included in the mesh network and an external assigned public key from an external device not included in the mesh network;
   determining, by the processor, that the external device is to be included in the mesh network based at least in part on receiving a request from the external device to join the mesh network, the request identifying the mesh network; and
   transmitting, by the processor based at least in part on determining that the external device is to be included in the mesh network, each of the one or more assigned public keys to the external device and the external assigned public key to each of the one or more devices to enable each of the one or more devices and the external device to set up respective meshnet connections.

2. The method of claim 1, further comprising:
   determining, by the processor based at least in part on receiving the one or more assigned public keys and the external assigned public key, one or more communication parameters associated with each of the one or more devices and an external communication parameter associated with the external device; and
   transmitting, by the processor, each of the one or more communication parameters to the external device and the external communication parameter to each of the one or more devices to enable the one or more devices and the external device to set up the respective meshnet connections.

3. The method of claim 1, further comprising:
   determining an external meshnet internet protocol (IP) to be utilized by the external device to communicate data over the meshnet connection.

4. The method of claim 1, further comprising:
   receiving a request from at least one of the one or more devices, the request indicating that the external device is to be included in the mesh network.

5. The method of claim 1, wherein
   the one or more devices include a first device and a second device,
   the second device is located locally with respect to the first device, and
   the external device is located remotely with respect to the first device.

6. The method of claim 1, wherein the one or more devices are associated with one or more accounts registered with the processor and the external device is associated with an external account registered with the processor, the one or more accounts being different from the external account.

7. The method of claim 1, wherein the request received from the external device identifies the mesh network based at least in part on identifying a public internet protocol (IP) address of at least one of the one or more devices included in the mesh network.

8. An infrastructure device configured to determine a mesh network, the infrastructure device comprising:
   a memory; and
   a processor communicatively coupled to the memory, the memory and the processor being configured to:
      receive one or more assigned public keys associated with one or more devices included in the mesh network and an external assigned public key from an external device not included in the mesh network;
      determine that the external device is to be included in the mesh network based at least in part on receiving a request from the external device to join the mesh network, the request identifying the mesh network; and
      transmit, based at least in part on determining that the external device is to be included in the mesh network, each of the one or more assigned public keys to the external device and the external assigned public key to each of the one or more devices to enable each of the one or more devices and the external device to set up respective meshnet connections.

9. The infrastructure device of claim 8, wherein the memory and the processor are configured to:
- determine, based at least in part on receiving the one or more assigned public keys and the external assigned public key, one or more communication parameters associated with each of the one or more devices and an external communication parameter associated with the external device; and
- transmit each of the one or more communication parameters to the external device and the external communication parameter to each of the one or more devices to enable the one or more devices and the external device to set up the respective meshnet connections.

10. The infrastructure device of claim 8, wherein the memory and the processor are configured to determine an external meshnet internet protocol (IP) address to be utilized by the external device to communicate data over the meshnet connection.

11. The infrastructure device of claim 8, wherein the memory and the processor are configured to receive a request from at least one of the one or more devices, the request indicating that the external device is to be included in the mesh network.

12. The infrastructure device of claim 8, wherein
- the one or more devices include a first device and a second device,
- the second device is located locally with respect to the first device, and
- the external device is located remotely with respect to the first device.

13. The infrastructure device of claim 8, wherein the one or more devices are associated with one or more accounts registered with the processor and the external device is associated with an external account registered with the processor, the one or more accounts being different from the external account.

14. The infrastructure device of claim 8, wherein the request received from the external device identifies the mesh network based at least in part on identifying a public internet protocol (IP) address of at least one of the one or more devices included in the mesh network.

15. A non-transitory computer-readable medium configured to store instructions, which when executed by a processor associated with an infrastructure device configured to determine a mesh network, configure the processor to:
- receive one or more assigned public keys associated with one or more devices included in a mesh network and an external assigned public key from an external device not included in the mesh network;
- determine that the external device is to be included in the mesh network based at least in part on receiving a request from the external device to join the mesh network, the request identifying the mesh network; and
- transmit, based at least in part on determining that the external device is to be included in the mesh network, each of the one or more assigned public keys to the external device and the external assigned public key to each of the one or more devices to enable each of the one or more devices and the external device to set up respective meshnet connections.

16. The non-transitory computer-readable medium of claim 15, wherein the processor is configured to:
- determine, based at least in part on receiving the one or more assigned public keys and the external assigned public key, one or more communication parameters associated with each of the one or more devices and an external communication parameter associated with the external device; and
- transmit each of the one or more communication parameters to the external device and the external communication parameter to each of the one or more devices to enable the one or more devices and the external device to set up the respective meshnet connections.

17. The non-transitory computer-readable medium of claim 15, wherein the processor is configured to determine an external meshnet internet protocol (IP) address to be utilized by the external device to communicate data over the meshnet connection.

18. The non-transitory computer-readable medium of claim 15, wherein the processor is configured to receive a request from at least one of the one or more devices, the request indicating that the external device is to be included in the mesh network.

19. The non-transitory computer-readable medium of claim 15, wherein
- the one or more devices include a first device and a second device,
- the second device is located locally with respect to the first device, and
- the external device is located remotely with respect to the first device.

20. The non-transitory computer-readable medium of claim 15, wherein the request received from the external device identifies the mesh network based at least in part on identifying a public internet protocol (IP) address of at least one of the one or more devices included in the mesh network.

\* \* \* \* \*